M. BIRKIGT.
VALVE GEAR.
APPLICATION FILED JUNE 21, 1915.
1,225,565.
Patented May 8, 1917.
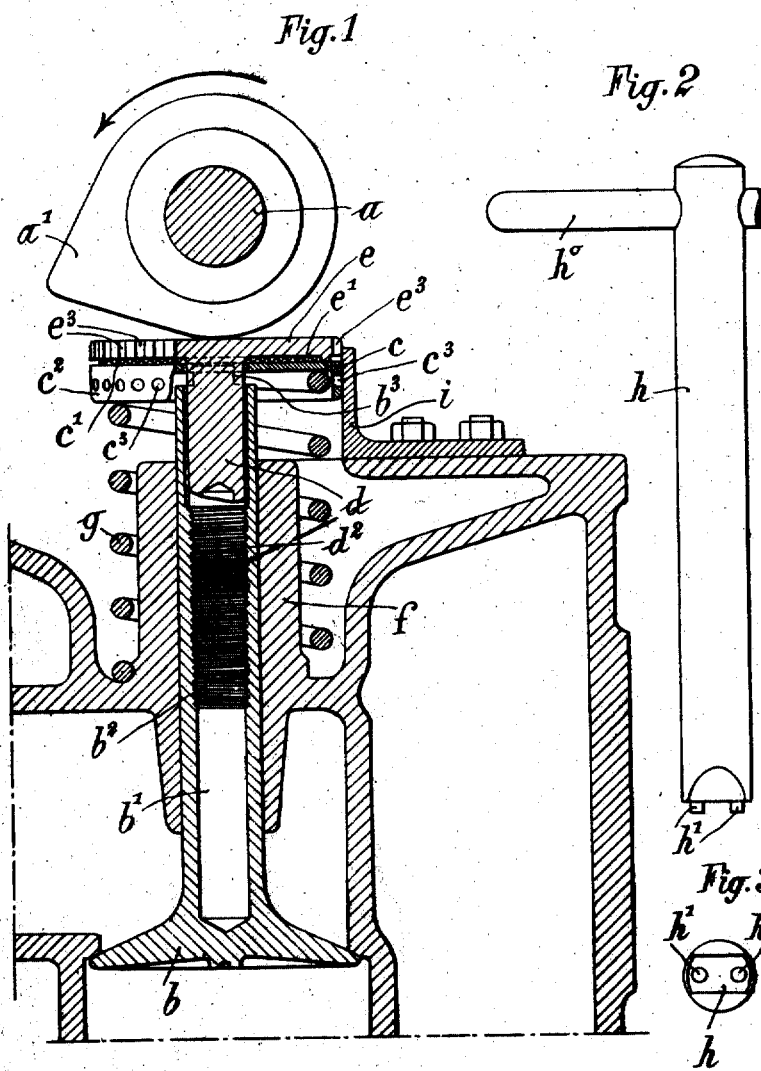

UNITED STATES PATENT OFFICE.

MARC BIRKIGT, OF BOIS-COLOMBES, FRANCE.

VALVE-GEAR.

1,225,565.   Specification of Letters Patent.   Patented May 8, 1917.

Application filed June 21, 1915. Serial No. 35,383.

*To all whom it may concern:*

Be it known that I, MARC BIRKIGT, engineer, a citizen of the Republic of Switzerland, residing at Bois-Colombes, Seine, France, have invented certain new and useful Improvements in Valve-Gears, of which the following is a specification.

This invention relates to valve gears, particularly for explosion engines and has for its object to make valve gears occupying less space and having less weight than hitherto.

The invention consists in arranging valve gears so that the cams and the cam shaft engage directly, without interposition of any intermediate part, with the spindles of the valves.

The invention further consists in providing the valve spindle with means for modifying its length at will, so as to compensate for any play which takes place.

The invention further consists in other arrangements which will be more fully pointed out in the following description, taken in conjunction with the accompanying drawing, in which a construction of the valve gear according to this invention is shown.

Figure 1 shows a sectional elevation through the axis of a valve.

Figs. 2 and 3 show respectively in elevation and in bottom plan view a spanner used for adjusting the length of the said valve spindle.

According to the invention, the engine is built in the usual way, with the difference that each of the cam shafts $a$ is mounted so that its axis is in the plane passing through the axes of a series of valves of the said engine and is normal to the said axes and on each of the said cam shafts are mounted cams $a^1$ so that they can engage directly with the spindles of the valves $b$.

The valve spindles are made so that their length can be modified at will. Each valve $b$ has a hollow spindle or stem $b^1$ provided on a portion of its length with a tapped thread $b^2$ preferably of very fine pitch, and at its end, is provided with a pair of diametrically opposite claws $b^3$ sufficiently long to act as long keys as will be seen further on.

A disk $c$ is provided and has on one of its faces a series of teeth $c^1$. The disk $c$, has a circular flange $c^2$ provided on the circumference with a ring of cylindrical holes or perforations $c^3$, while at its center the disk $c$ has a hole which is adapted to fit over the claws $b^3$ of the hollow spindle $b^1$ and to slide on the said spindle, without being able to rotate about it.

A cylindrical spindle $d$ has at one of its ends a screw thread $d^2$ which can be screwed into the tapped thread $b^2$ and has at its other end a disk $e$ of circular outline, having an outside diameter equal to the outside diameter of the disk $c$. The said disk $e$ is provided on its face opposite the disk $c$, with a ring of teeth $e^1$ which can engage with the teeth $c^1$ of the ring $c$, and on its circumference, along the generatrices, with grooves $e^3$ which can form teeth on the said circumference.

The valve is introduced into the cylinder of the engine, and its spindle $b^1$ is introduced into the guide conduit $f$ provided for the purpose in the cover of the cylinder of the said engine. The claws $b^3$ of the spindle $b$ are then engaged, on the outer side of the said cover, with the hole of the disk $c$, after having inserted between the said disk and the outer face of the cover of the cylinder, a helical spring $g$ which surrounds the guide $f$. The screw threaded spindle $d$ is then screwed into the tapped thread of the hollow spindle $b^1$. An adjustment spanner is provided having a handle $h^0$ and on its other end a pair of parallel pins $h^1$ equidistant from the axis of the spindle $h$ of the said spanner, and such that their axial distance $a$ part is practically equal to the distance separating from each other the respective central planes of one of the holes $c^3$ of the disk $c$ and of one of the grooves $e^3$ of the disk $e$. With the use of this spanner the length of the valve spindle can be adjusted at will, it being only necessary to act by means of the spanner $h$ on the disk $c$, by engaging one of its pins with one of the holes $c^3$ of the flange $c^2$ and by acting with the other pin on the face of one of the teeth formed by the grooves $e^3$ of the projection $e$. This results in the spindle $d^2$ being screwed into the spindle $b^1$ or, on the contrary, unscrewed from it. The said spindle $d^2$ is then locked by the teeth $c^1$ of the disk $c$ controlled by the spring $g$, and prevented from rotating by the claws $b^3$ acting as keys. Moreover, the edge of the cylinder is preferably provided with another guide part $i$ for the disk $e$ and the disk $c$, which part is constituted by a segment of cylinder of an inside diameter equal to the outside diameter of the said parts to be guided, and mounted so that when the cam engages with the disk e the latter has a tendency to press against its guide i.

Obviously the invention is not limited to the construction described, but comprises any modifications within the scope of the claims, particularly that in which a nut and a lock-nut are used for adjusting the length of the valve spindle.

Having now particularly described and ascertained the nature of my said invention and in what manner the same is to be performed, I declare that what I claim is:—

1. A valve gear comprising a valve stem formed of two telescopically associated adjustable sections, the one section having a head on the upper free end thereof and a lower screw-threaded stem and the other section tubular and interiorly screw-threaded to receive the stem of the other section and also provided with a valve on the lower end of the same, a non-rotatable disk mounted on the section provided with the valve and having a vertical sliding movement on said section, the lower side of the head and the upper side of the disk being respectively provided with interlocking teeth, and resilient means engaging the under side of the disk and a part of the valve gear for holding said valve upon its seat and forcing said disk against the head whereby the teeth of the head and disk are caused to engage to lock the valve stem sections in adjusted positions.

2. A valve gear comprising a valve stem composed of two adjustable sections, one of the sections being tubular and threaded and the other movable in the tubular one, the tubular section having a valve on its lower end and the remaining section being provided with a head on its upper free end, a non-rotatable slidable disk on the stem adjacent to the said head, beveled teeth being formed on the adjacent opposing sides of the disk and head, spring means engaging the disk and a suitable abutment and operating to normally seat the valve and force the toothed sides of the disk and head into engagement to lock the valve stem sections in adjusted positions, the disk and head being formed with means for adjustably turning one with relation to the other.

3. The combination with a valve seat, of a valve stem having a valve normally held in closed position against the said seat, the valve stem comprising two adjustable sections, one section carrying the valve and of elongated tubular form with interior threads and the other section also threaded and adjustably fitted in the tubular section and carrying a disk head on its free upper end, the said disk head being provided with peripheral spaced operating means, a non-rotatable disk slidably associated with the tubular portion of the stem and held adjacent to the said head, the disk being also provided with peripheral operating means, the spaced operating means of the head and the peripheral operating means of the non-rotatable disk providing means for turning one of these devices relatively to the other to effect the adjustment, the disk and head on their adjacent faces having interlocking teeth, and a spring surrounding said valve stem and engaging the disk and an abutment forming part of the valve seat organization and exerting a tension to normally seat the valve and force the teeth of the slidable disk into engagement with the teeth of the head to lock the valve stem sections in adjusted positions.

4. The combination of a valve seat having an upstanding guide, a valve normally closed against said seat and having a stem comprising two adjustable sections, one being tubular and threaded and the other threaded and shiftable in the tubular section, the valve being carried by the tubular section and the remaining section having an enlarged head at its upper end, a non-rotatable disk slidably mounted on the valve stem and engaging the tubular section and held adjacent to the said head, the head and disk being provided with interlocking teeth on their adjacent faces and both the head and disk engaging the upstanding guide, the said guide serving to brace the head and disk and maintain the latter in proper vertical alinement, and a spring engaging a part of the valve seat and the said disk to effect an interlock of the teeth of the head and disk and maintain the sections of the valve stem in locked adjusted positions, the head and disk being provided with peripheral means whereby one may be turned relatively to the other in effecting the adjustment of the valve.

In testimony whereof I have hereunto set my hand in presence of two subscribing witnesses.

MARC BIRKIGT.

Witnesses:
 MATEO GRAY,
 G. INGENAULT.